J. H. STULL.
FRICTION CLUTCH.
APPLICATION FILED NOV. 19, 1914.
1,156,445.
Patented Oct. 12, 1915.
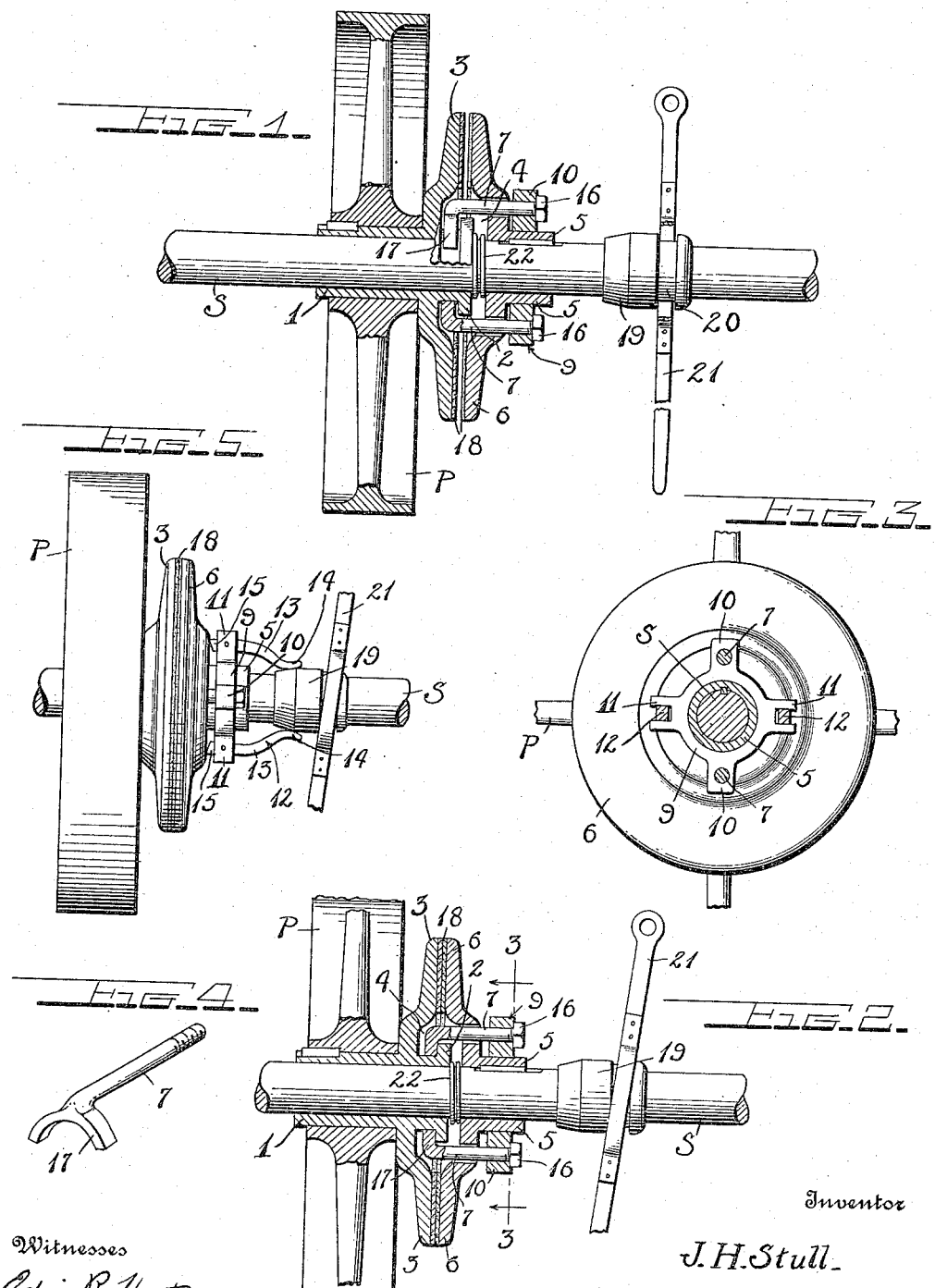
Witnesses
Edwin R. Hurst
C. Clemmer
Inventor
J. H. Stull
By H. R. Willson & Co.
Attorneys
COLUMBIA PLANOGRAPH CO., WASHINGTON, D. C.

UNITED STATES PATENT OFFICE.

JACOB H. STULL, OF FREMONT, OHIO.

FRICTION-CLUTCH.

1,156,445.  Specification of Letters Patent.  Patented Oct. 12, 1915.

Application filed November 19, 1914. Serial No. 873,023.

*To all whom it may concern:*

Be it known that I, JACOB H. STULL, a citizen of the United States, residing at Fremont, in the county of Sandusky and State of Ohio, have invented certain new and useful Improvements in Friction-Clutches; and I do declare the following to be a full, clear, and exact description of the invention, such as will enable others skilled in the art to which it appertains to make and use the same.

This invention relates to a friction clutch for loose pulleys and the like and has for its object to provide a device of this kind for mounting a pulley normally loose on a line or counter shaft and whereby the pulley may be frictionally engaged and revolved with the shaft and disengaged at will.

Another object is to provide a clutch of this character which consists of comparatively few parts which render it simple and durable.

These objects are accomplished by the construction and combination of parts as hereafter described and illustrated in the drawings in which;

Figure 1 represents a longitudinal section of a clutch constructed in accordance with this invention and mounted on a shaft and having a pulley mounted loosely thereon; the parts of the clutch being in position to release the pulley from frictional engagement therewith; Fig. 2 is a similar view showing the parts in position frictionally engaging the pulley; Fig. 3 is a transverse section taken on the line 3—3 of Fig. 2; Fig. 4 is a detail perspective view of one of the operating members; Fig. 5 is a side elevation thereof with the parts in the position shown in Fig. 2.

In the embodiment illustrated a shaft S is shown which may be either a line or a counter shaft and on which is loosely mounted an elongated sleeve 1 having an annular flange or collar 2 at one end thereof and a pulley P fixed thereto preferably near the other end.

A clutch member 3 in the form of a disk is fixed to this sleeve 1 between the pulley P and the flange 2 preferably adjacent said pulley and has a hollow central portion offset from the operating or working face thereof to form in conjunction with the coöperating clutch disk a chamber 4 for a purpose to be described. Another sleeve 5 of less length than the sleeve 1 is keyed on the shaft S and to revolve therewith. Secured to the inner end of this sleeve 5 is a clutch disk 6 similar in construction to the disk 3 having a concaved central portion arranged opposite the portion of the disk 3 to form the chamber 4 in which is housed the flange 2 of the sleeve 1 and operating members 7 which will be hereinafter further described. Loosely mounted on this sleeve 5 is a collar 9 having a pair of diametrically disposed radially extending apertured lugs 10 and two pairs of apertured ears 11 disposed diametrically to each other and extending radially from said collar 9 in a plane at right angles to the plane of the lugs 10.

Fulcrumed between each pair of ears 11 are levers 12 having long arm portions 13 curved inwardly toward the shaft S and outward at their terminals to form cams 14 and which have short cam portions 15 adapted, as the long arms 13 are moved outward, to move the collar 9 outward on the sleeve 5 for a purpose to be described.

The clutch operating members 7 are shown in the form of rods which are mounted at one end in the apertured lugs 10 of the collar 9 with their outer ends threaded and provided with nuts 16 for adjusting said rods in said collar. The inner end of these rods are provided with arcuate sleeve engaging arms 17 which are here shown secured intermediately of their ends to the inner ends of the rods 7 and which are designed to partially encircle the sleeve 1 between the flange 2 thereof and the clutch member 3 as is shown clearly in Fig. 1. These arcuate sleeve engaging members are disposed diametrically opposite to each other and are designed to engage the flange 2 of the sleeve 1 and move said sleeves 2 and 5 toward each other thereby forcing the friction disks 3 and 6 into gripping or frictional contact.

The disk 6 is provided with oppositely disposed apertures in the concaved portion thereof through which the rods 7 are designed to freely move.

A coiled spring 22 is disposed on the shaft S between the flange 2 of the sleeve 1 and the inner face of the disk 6 and exerts its tension to normally force said disks apart.

A suitable friction material 18 such as leather or fiber is preferably interposed between the contact faces of the disks 3 and 6 to provide a better friction surface.

A shift collar or cone shaped member 19 is slidably mounted on the shaft S adjacent the cam portions 14 of the lever arms 13 and which is provided with an annular groove 20 at its outer end to receive the yoke of a shift lever 21. The tapered or cone shaped portion of this member 19 is disposed adjacent the levers 12 and is adapted to be wedged between the cam portion 14 of the arms 13 as shown in Fig. 5 by a throw of the member 19 by the shift lever 21.

In the use of this clutch when the parts are in the position shown in Fig. 1 and it is desired to bring the members of the clutch into gripping relation the shift lever 21 is moved inward thereby sliding the cone shaped collar 19 under the cam portions of the levers 12 thus forcing said levers outward and moving the collar 9 away from the clutch member 6 which causes the arcuate gripping arms 17 to engage the flange 2 of the sleeve 1 and move the sleeve 5 toward sleeve 1 thereby forcing the clutch members or disks 3 and 6 together into gripping relation and frictionally locking the pulley to the shaft to provide for its rotation therewith.

To disengage the pulley it is obvious that the shift lever 21 will be moved in the opposite direction to disengage the collar 19 from the lever 12 and when in this position the coiled spring 22 which is disposed between the flange 2 of sleeve 1 and the disk 6 will force said disk 6 away from disk 3 thereby disengaging said disks and permitting the shaft to revolve without affecting the pulley.

I claim as my invention:

1. A friction clutch comprising an elongated sleeve adapted to be loosely mounted on a shaft and having a flange at one end, a friction disk secured to said sleeve at a point spaced inward from said flange, a second sleeve adapted to be disposed on the shaft in alinement with said first mentioned sleeve and having a friction disk on its inner end, said disk having apertures therein, a collar slidably mounted on said second sleeve outside said friction disk, means carried by said collar and extending through the apertures in the friction disk of said sleeve and having elements for engaging the first mentioned sleeve, and means for operating said collar to move said disks toward each other.

2. A friction clutch comprising an elongated sleeve having a friction disk fixed thereto at a point intermediate of its ends, said disk having a concaved central portion, a second sleeve having a friction disk mounted on one end, a collar mounted on said second sleeve and having adjustable elements extending through the disk on said second sleeve, said elements and said first mentioned sleeve having coöperating engaging means, and means for moving said collar to bring said coöperating means into action for moving said disks toward each other into frictional engagement.

3. A friction clutch comprising an elongated sleeve having a friction disk fixed thereto at a point intermediate of its ends, said disk having a concaved central portion, a second sleeve having a friction disk mounted on one end, a collar mounted on said second sleeve and having adjustable elements extending through the disk on said second sleeve, said elements and said first mentioned sleeve having coöperating engaging means, levers fulcrumed on said collar and extending laterally therefrom in outward direction, and means for engaging said levers to move said collar outwardly and thereby interlock the engaging elements carried by the two sleeves.

4. A friction clutch comprising two longitudinally alining sleeves having friction disks on their adjacent ends, the disk on one sleeve being spaced from the inner end thereof, a longitudinally sliding collar mounted on the other sleeve and having rods adjustably mounted therein, said rods extending through the disk on the sleeve on which said collar is mounted and having inturned arcuate arms on their inner ends, and a flange on the other sleeve for engagement by said arms, and means for moving said collar to bring said arms and flange into forcible engagement thereby moving the disks toward each other into frictional engagement.

5. In a friction clutch the combination with a shaft, a sleeve slidably keyed to said shaft and provided with a friction disk at one end, said disk having apertures therein adjacent said shaft, a collar mounted on said sleeve, longitudinally adjustable members carried by said collar and extending through the apertures in said disks with their inner ends provided with laterally extending inwardly projecting arcuate arms, another sleeve mounted on said shaft and having a flange at its inner end, a friction disk secured thereto and spaced from said flange, the arcuate arms carried by the first mentioned sleeve encircling said last mentioned sleeve between said friction disk and flange, cam levers carried by said collar, and means for engaging said levers to retract said collar and thereby move said sleeves toward each other to bring their friction disks into gripping relation.

6. In a friction clutch the combination with a shaft, a sleeve slidably keyed to said shaft and provided with a friction disk at one end, said disk having apertures therein adjacent said shaft, a collar mounted on said sleeve, longitudinally adjustable members carried by said collar and extending through the apertures in said disks with their inner ends provided with laterally extending inwardly projecting arcuate arms, another sleeve mounted on said shaft and having a flange at its inner end, a friction disk secured thereto and spaced from said flange, the arcuate arms carried by the first mentioned sleeve encircling said last mentioned sleeve between its friction disk and flange, cam levers carried by said collar, means for engaging said levers to retract said collar and thereby move said sleeves toward each other to bring their friction disks into gripping relation, and a coiled expansion spring arranged on said shaft between said sleeves for forcing them normally apart.

In testimony whereof I have hereunto set my hand in presence of two subscribing witnesses.

JACOB H. STULL.

Witnesses:
C. B. CARR,
A. E. STULL.

Copies of this patent may be obtained for five cents each, by addressing the "Commissioner of Patents, Washington, D. C."